United States Patent
Shen et al.

(10) Patent No.: US 9,300,374 B2
(45) Date of Patent: Mar. 29, 2016

(54) COMMUNICATIONS TERMINAL, APPARATUS, AND METHOD FOR DETECTING RANK INDICATION

(71) Applicant: Spreadtrum Communications (Shanghai) Co., Ltd., Shanghai (CN)

(72) Inventors: Xuqiang Shen, Shanghai (CN); Xiaojian Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/358,081

(22) PCT Filed: Dec. 19, 2012

(86) PCT No.: PCT/CN2012/086942
§ 371 (c)(1),
(2) Date: May 14, 2014

(87) PCT Pub. No.: WO2013/091546
PCT Pub. Date: Jun. 27, 2013

(65) Prior Publication Data
US 2014/0307824 A1    Oct. 16, 2014

(30) Foreign Application Priority Data
Dec. 20, 2011 (CN) .......................... 2011 1 0431549

(51) Int. Cl.
*H04L 27/01* (2006.01)
*H04B 7/04* (2006.01)
(Continued)

(52) U.S. Cl.
CPC ............ *H04B 7/0417* (2013.01); *H04L 5/0007* (2013.01); *H04L 5/0048* (2013.01);
(Continued)

(58) Field of Classification Search
CPC .................................. H04L 1/00; H04L 25/03
See application file for complete search history.

(56) References Cited

U.S. PATENT DOCUMENTS

| | | | |
|---|---|---|---|
| 2009/0067531 | A1 | 3/2009 | Lee et al. |
| 2010/0097937 | A1 | 4/2010 | Pietraski et al. |

(Continued)

FOREIGN PATENT DOCUMENTS

| | | | |
|---|---|---|---|
| CN | 101517929 A | | 8/2009 |
| CN | 102227886 A | | 10/2011 |

(Continued)

OTHER PUBLICATIONS

PCT International Search Report dated Mar. 4, 2013, PCT Patent Application PCT/CN2012/086942.

(Continued)

*Primary Examiner* — Jaison Joseph
(74) *Attorney, Agent, or Firm* — Vierra Magen Marcus LLP

(57) ABSTRACT

Methods and communication terminals for determining rank indication in a multicarrier communication system, wherein communication in the multicarrier communication system is carried out over a plurality of subcarriers, wherein the communication terminal communicates with an interface station within a cell in a multiple-input-multiple-output (MIMO) configuration. In particular, multicarrier symbols are received including pilot signals from the interface station, wherein the pilot signals contain pilot data, and channel properties are estimated based on the received multicarrier symbols, wherein the channel properties include channel properties of at least one subcarrier carrying one of the pilot signals. The pilot data are equalized based on the channel properties for determination of at least one pilot power and at least one interference power based on the equalized pilot data, and a rank indication is determined based on the at least one pilot power and the at least one interference power.

47 Claims, 5 Drawing Sheets

(51) Int. Cl.
*H04L 5/00* (2006.01)
*H04L 25/02* (2006.01)
*H04L 25/03* (2006.01)

(52) U.S. Cl.
CPC ............ *H04L25/0204* (2013.01); *H04L 27/01* (2013.01); *H04L 25/0224* (2013.01); *H04L 25/03159* (2013.01)

(56) References Cited

U.S. PATENT DOCUMENTS

| | | | |
|---|---|---|---|
| 2010/0238824 A1 | 9/2010 | Farajidana et al. | |
| 2010/0260251 A1* | 10/2010 | Yokomakura et al. | 375/232 |
| 2011/0105137 A1* | 5/2011 | Gaal et al. | 455/452.1 |
| 2011/0106969 A1* | 5/2011 | Choudhury et al. | 709/236 |
| 2011/0134747 A1* | 6/2011 | Kwon et al. | 370/208 |
| 2011/0228835 A1 | 9/2011 | Sakai | |
| 2011/0310946 A1 | 12/2011 | Sakai | |
| 2012/0307927 A1* | 12/2012 | Nammi et al. | 375/267 |
| 2013/0051490 A1* | 2/2013 | Gupta et al. | 375/296 |
| 2013/0121269 A1* | 5/2013 | Nammi et al. | 370/329 |
| 2013/0122843 A1 | 5/2013 | Sakai | |

FOREIGN PATENT DOCUMENTS

| | | |
|---|---|---|
| CN | 102237969 | 11/2011 |
| CN | 102271026 | 12/2011 |
| CN | 102523026 | 6/2012 |
| WO | 2010104016 A1 | 9/2010 |
| WO | 2011148779 A1 | 12/2011 |

OTHER PUBLICATIONS

PCT Written Opinion of the International Searching Authority dated Mar. 15, 2013, PCT Patent Application PCT/CN2012/086942.
English Translation of Abstract of Chinese Patent Application No. CN102237969.
English Translation of Abstract of Chinese Patent Application No. CN102271026.
English Translation of Abstract of Chinese Patent Application No. CN102523026.
English Abstract of CN101517929, published Aug. 26, 2009.
English Abstract of CN102227886, published Oct. 26, 2011.
English Abstract of WO2010104016, published Sep. 16, 2010.
English Abstract of WO2011148779, published Dec. 1, 2011.
Chinese Office Action dated Sep. 18, 2013, Chinese Application No. 201110431549.2, with English Notification of First Office Action, 11 pages.

* cited by examiner

COMMUNICATIONS TERMINAL, APPARATUS, AND METHOD FOR DETECTING RANK INDICATION

CROSS REFERENCE TO RELATED APPLICATIONS

This application claims the priority and benefit under Article 8 of Patent Cooperation Treaty of Chinese Patent Application No. 201110431549.2, filed on Dec. 20, 2011, the content of which is incorporated herein by reference in its entirety.

FIELD OF THE DISCLOSURE

This disclosure relates to methods and apparatus for communication systems, and more particularly, to methods and apparatus for detecting a rank indication.

BACKGROUND OF THE DISCLOSURE

Orthogonal Frequency Division Multiplexing (OFDM) is one of the Multi-Carrier Modulation (MCM) technologies. OFDM divides a frequency channel or frequency carrier into multiple orthogonal sub-channels each associated with a frequency subcarrier and allows for transmission of sub-data streams in parallel at low rates as opposed to a single data stream over a single frequency carrier at a much higher rate. The low-rate sub-data streams each modulate one of the sub-carriers. At the receiving end, the received orthogonal sub-carriers each carrying a sub-data stream can be separated from one another using appropriate techniques to reduce inter-channel interference (ICI) between the sub-channels. Because the bandwidth of each sub-channel is smaller than the bandwidth of the channel, fading in each sub-channel generally can be considered flat across the frequency bandwidth of that sub-channel. As a result, inter symbol interference may be eliminated. In addition, because the bandwidth of each sub-channel is only a small portion of the bandwidth of the original channel, channel equalization also becomes easier.

The Long Term Evolution (LTE) project is directed to developing wireless communications standards as an evolution from 3G technology. The project began at the 2004 3rd Generation Partnership Project (3GPP) Conference held in Toronto. LTE uses OFDM and MIMO (Multiple-Input Multiple-Output) technologies. With a 20 MHz spectral bandwidth, LTE can provide a downlink peak rate of 326 Mbit/s and an uplink peak rate of 86 Mbit/s. LTE can improve user experience at cell edges, increase cell capacities, and reduce system latencies.

An LTE network may include a number of cells, each corresponding to a geographical area. Within each cell, communication terminals such as mobile phones or, more generally, user equipment (UE), access network services such as phone services or Internet services, data streaming, etc., through an interface station such as a base station, which is also referred to as eNode B in LTE terminology. An LTE system can implement either Time Division Duplex (TDD) or Frequency Division Duplex (FDD). In TDD, communications in two opposite directions between the base station and mobile phones occur in the same frequency band but different time slots. In FDD, communications in two opposite directions between the base station and mobile phones occur at the same time but in different frequency bands.

In a MIMO configuration, a transmitter such as a base station may transmit signals from multiple transmitting antennas, and a receiver such as UE may receive multiple transmitted signals at multiple receiving antennas. The base station may employ different transmission schemes with a MIMO configuration. For example, in a multi-stream MIMO scheme such as spatial multiplexing, the base station transmits different codewords from the different transmitting antennas. In a single-stream MIMO scheme such as transmit diversity, the base station transmits the same codeword from all transmitting antennas. Parallel transmission of different codewords from transmitting antennas provides higher throughput but requires better channel condition. If channel condition is not satisfactory, attempting to use spatial multiplexing may result in even lower throughput because a high pack loss rate may require repeated transmissions of the same packets.

In order for the base station to determine whether it should transmit multiple codewords in parallel or use transmit diversity to transmit the same codeword, UE must determine and report a Rank Indication (RI) to the base station. RI is an indication of the number of transmission layers or data streams the UE can distinguish. For example, an RI value of 1 indicates that the UE can only receive one stream at a time, meaning that the base station can only send one codeword at a time from the multiple transmitting antennas. An RI value of 2 suggests that the UE can receive two streams, allowing the base station to transmit two codewords in parallel from the transmitting antennas.

Conventionally, RI is determined by computing the rank of a channel matrix, which reflects the condition of the channels between the multiple transmitting antennas and receiving antennas. However, RI determined through such conventional method often does not accurately reflect the channel condition. For example, under many circumstances, with relatively strong correlation between the channels, the computation of the channel matrix rank results in a higher RI value, indicating that the channel environment is suitable for multi-stream transmission; yet noise and interference may be so high, or the channel environment so complicated (as in high frequency-selective fading or high speed movements), that a multi-stream MIMO transmission link may result in an even lower throughput than a single-stream diversity transmission link. Thus, under these circumstances, determining RI by computing the rank of the channel matrix may not produce reliable result but requires complex computation.

U.S. Patent Application Publication No. 2011/01051137 (A1) discloses an example of a conventional method for a rank indication parameter detection, as well as methods and apparatuses for signaling rank indication and precoding matrix indications.

Therefore, there is a need for methods and apparatus that conveniently determine a rank of a MIMO channel to more accurately indicate whether the current channel environment allows a multi-stream MIMO transmission to improve throughput.

BRIEF SUMMARY OF THE DISCLOSURE

Consistent with embodiments of the present disclosure, there is provided a method in a communication terminal for determining rank indication in a multicarrier communication system, wherein communication in the multicarrier communication system is carried out over a plurality of subcarriers, wherein the communication terminal communicates with an interface station within a cell in a multiple-input-multiple-output (MIMO) configuration. The method includes receiving multicarrier symbols, the multicarrier symbols including pilot signals from the interface station, wherein the pilot signals contain pilot data; estimating channel properties based on the received multicarrier symbols, wherein the channel properties include channel properties of at least one subcarrier carrying one of the pilot signals; equalizing the pilot data based on the channel properties; determining at least one pilot power and at least one interference power based on the equalized pilot data; and determining a rank indication based on the at least one pilot power and the at least one interference power.

Consistent with other embodiments of the present disclosure, there is also provided a communication terminal in a multicarrier communication system, wherein communication in the multicarrier communication system is carried out over a plurality of subcarriers, wherein the communication terminal communicates with an interface station within a cell in a multiple-input-multiple-output (MIMO) configuration. The communication terminal includes a receiver that receives multicarrier symbols, the multicarrier symbols including pilot signals from the interface station, wherein the pilot signals contain pilot data; an estimator that estimates channel properties based on the received multicarrier symbols, wherein the channel properties include channel properties of at least one subcarrier carrying one of the pilot signals; an equalizer that equalizes the pilot data based on the channel properties; a first determination unit that determines at least one pilot power and at least one interference power based on the equalized pilot data; and a second determination unit that determines a rank indication based on the at least one pilot power and the at least one interference power.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the subject matter and, together with the description, serve to explain the principles of the subject matter.

DETAILED DESCRIPTION OF THE DISCLOSURE

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Consistent with embodiments of the present disclosure, in a multicarrier communication system where communication terminals communicate over multiple subcarriers, pilot signals or reference signals transmitted on one or more of the subcarriers can be used to estimate signal power as well as interference or noise level. A comparison of the signal power to the interference or noise level can be used to determine a rank of the channel environment in a MIMO configuration.

Embodiments described below use LTE systems and devices as an example. In an LTE system, communication terminals, such as mobile phones or, more generally, user equipment (UE), communicate with base stations or eNode Bs to access network services such as telephone services, Internet, data streaming, etc. An LTE system can implement either Time Division Duplex (TDD) or Frequency Division Duplex (FDD). In TDD, communications in two opposite directions between the base station and mobile phones occur in the same frequency band but different time slots. In FDD, communications in two opposite directions between the base station and mobile phones occur at the same time but in different frequency bands.

It is to be understood, however, that technologies described herein can be equally applied to such other OFDM systems as WiFi or WiMAX systems or other multi-carrier systems. The theories and applications of OFDM and/or multicarrier technologies are well known in the art and a background discussion thereof is therefore not provided here.

Figure 1:
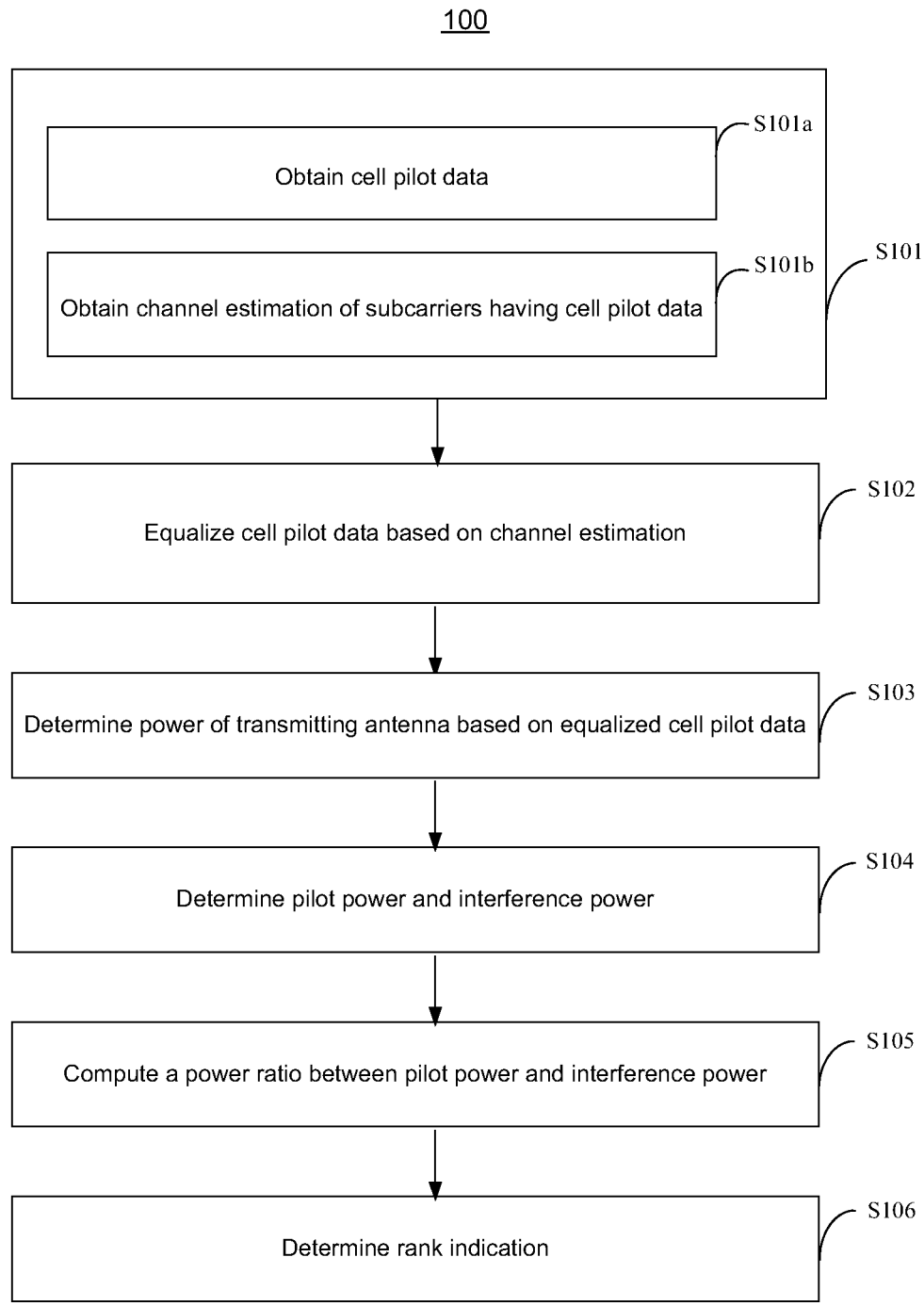
FIG. 1 illustrates a method for determining a rank indication in a communication terminal, according to an exemplary embodiment.

FIG. 1 illustrates a method 100 in a communication terminal for detecting or determining a rank indication. The communication terminal recovers frequency domain data from received OFDM symbols and also estimates frequency domain channel properties based on the received OFDM symbols, which are not shown in the figure. Methods for obtaining frequency domain data and channel estimation would be apparent to those skilled in the art. For example, the communication terminal may include a Fast Fourier Transformation (FFT) engine or other conventional means to convert received time domain OFDM symbols into frequency domain to obtain frequency domain data and then calculate channel estimation based on the frequency domain data. Accordingly, the methods of obtaining frequency domain data and frequency domain channel estimation will not be described in detail here. The frequency domain data may include subcarrier data (i.e., data carried on each subcarrier), an index of the receiving antenna, an index of the received OFDM symbol, and/or an index of the subcarrier. The frequency domain channel estimation may also include such indices as mentioned in addition to the estimated channel properties. In addition, the frequency domain channel estimation may also include an index of the transmitting antenna.

In step S101, the communication terminal obtains cell pilot data or pilot signals from the frequency domain data and a channel estimation of those subcarriers carrying the cell pilot data from frequency domain channel estimation of the OFDM symbols. In an MIMO configuration, multiple transmitting antennas may transmit pilot data, in which case the communication terminal can identify, in step S101, the pilot data associated with a particular transmitting antenna by an identification, such as an index, of the transmitting antenna. The communication terminal may obtain the cell pilot data and channel estimation at the same time or in separate steps. As an example, as shown in FIG. 1, step S101 can include two sub-steps, i.e., a sub-step S101a, in which the communication terminal obtains cell pilot data, and a sub-step S101b, in which the communication terminal obtains a channel estimation of the subcarriers carrying the cell pilot data.

In step S102, the communication terminal equalizes the cell pilot data based on the channel estimation of the subcarriers carrying the pilot data. In step S103, the communication terminal determines the transmission power of each transmitting antenna based on the equalized cell pilot data. The communication terminal separately determines, in step S104, the power of the pilot signals and the power of interference, and then, in step 105, calculates a power ratio between the two power levels. In step S106, the communication terminal determines a rank indication parameter based on the power ratio.

As described above, LTE can include either a Time Division Duplex (TDD) LTE or a Frequency Division Duplex (FDD) LTE. Thus, in an LTE system, signal transmissions can have two different frame structures. In both FDD and TDD LTE, a radio frame is 10 milliseconds (ms). In FDD, a frame is divided into 10 subframes and each subframe is further divided into 2 time slots. Each subframe is 1 ms and each time slot is 0.5 ms. In TDD LTE, a frame is divided into 2 half-frames, each half-frame is divided into 5 subframes, and each subframe contains 2 time slots. Each half-frame is 5 ms, each subframe is 1 ms, and each slot is 0.5 ms. The two time slots within each subframe are referred to as the even-numbered slot and the odd-numbered slot, respectively.

Each time slot may contain a number of OFDM symbols. As is well known in the art, an OFDM symbol includes a cyclic prefix, which is a repetition of an end portion of the symbol, to combat multipath effects. The number of OFDM symbols in each time slot thus depends on the length of the cyclic prefix (CP). In LTE, when a normal cyclic-prefix (Normal CP) is used, one time slot contains 7 OFDM symbols; when an extended cyclic-prefix (Extended CP) is used, one time slot contains 6 OFDM symbols.

Figure 2:
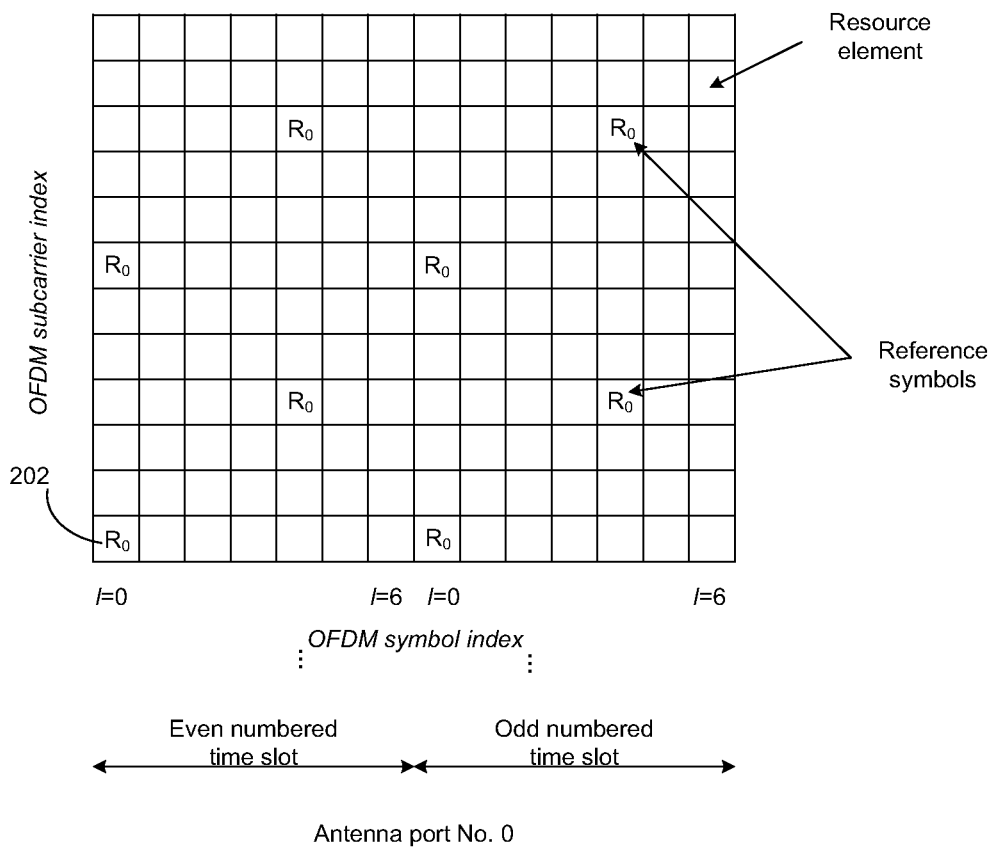
FIG. 2 illustrates a symbol-subcarrier diagram showing the distribution of cell reference symbols in a normal cyclic prefix scheme with a one-antenna configuration, according to an exemplary embodiment.

FIG. 2 shows a two-dimensional resource grid 200 for LTE networks, where the horizontal dimension reflects OFDM symbols in time and the vertical dimension reflects subcarriers. An OFDM symbol is transmitted over a number of subcarriers for a time duration called a symbol period. A basic resource unit in LTE is defined as one subcarrier per OFDM symbol time period and is referred to as a Resource Element (RE). An RE is the smallest block on the 2-dimensional symbol-subcarrier grid.

With the symbol-subcarrier grid and resource elements defined thereon, data can be identified with reference to the position of the corresponding resource elements on the grid. As is well known in the art, an OFDM symbol, which is a time domain waveform, generally contains some form of data in the frequency domain, i.e., data carried over the various subcarriers. In a MIMO configuration, frequency domain data over a particular subcarrier in an OFDM symbol can be expressed as DataAftFft_j_l(k), where j is the receiving antenna index, l is the OFDM symbol index in the subframe, and k is the subcarrier index. Similarly, frequency domain channel estimation may be expressed as FreqCheData_p_j_l(k), where p is the transmitting antenna index. Both the frequency domain data DataAftFft_j_l(k) and the frequency domain channel estimation FreqCheData_p_j_l(k) are complex numbers.

Figure 3:
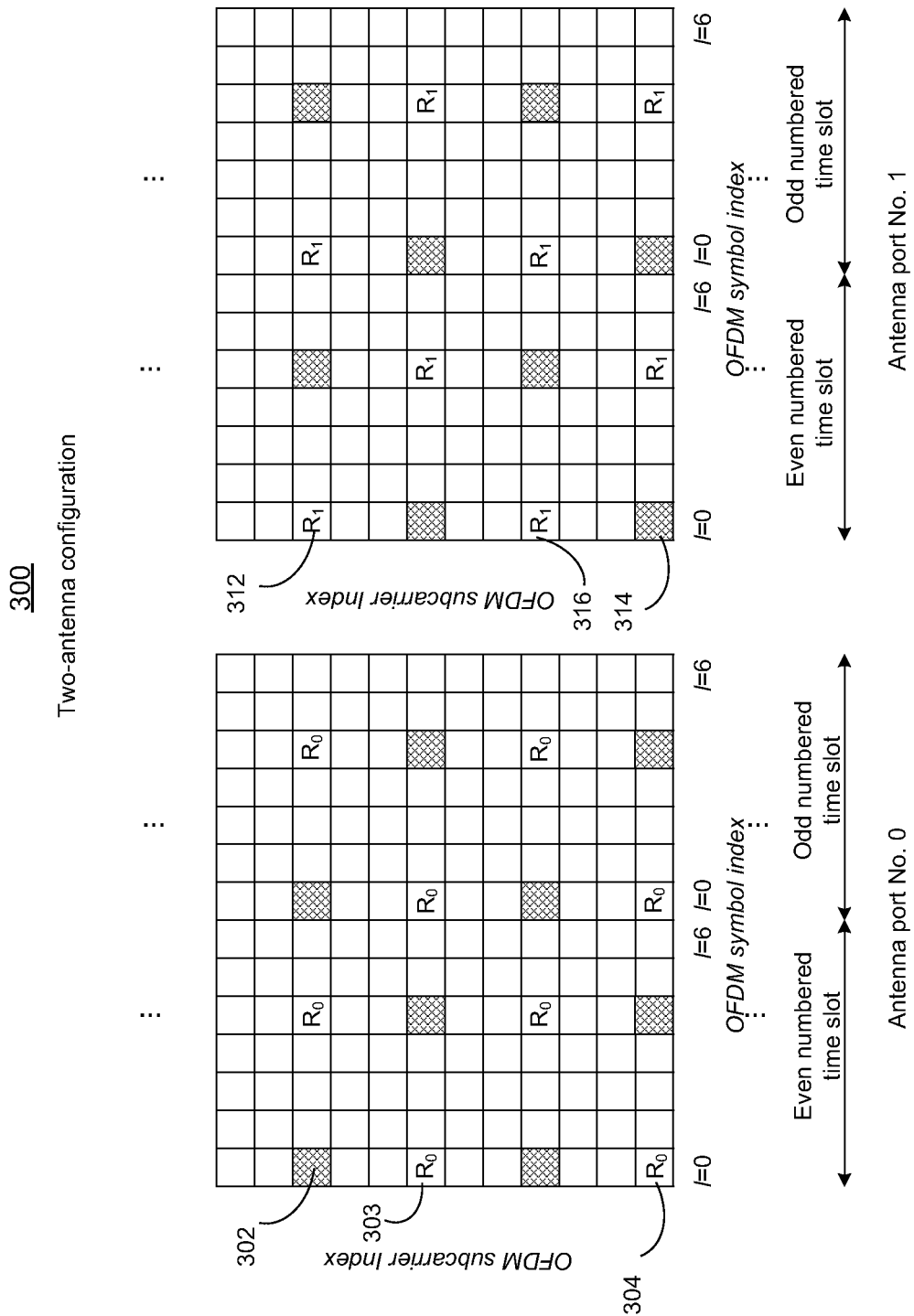
FIG. 3 illustrates a symbol-subcarrier diagram showing the distribution of cell reference symbols in a normal cyclic prefix scheme with a two-antenna configuration, according to another exemplary embodiment.
Figure 4:
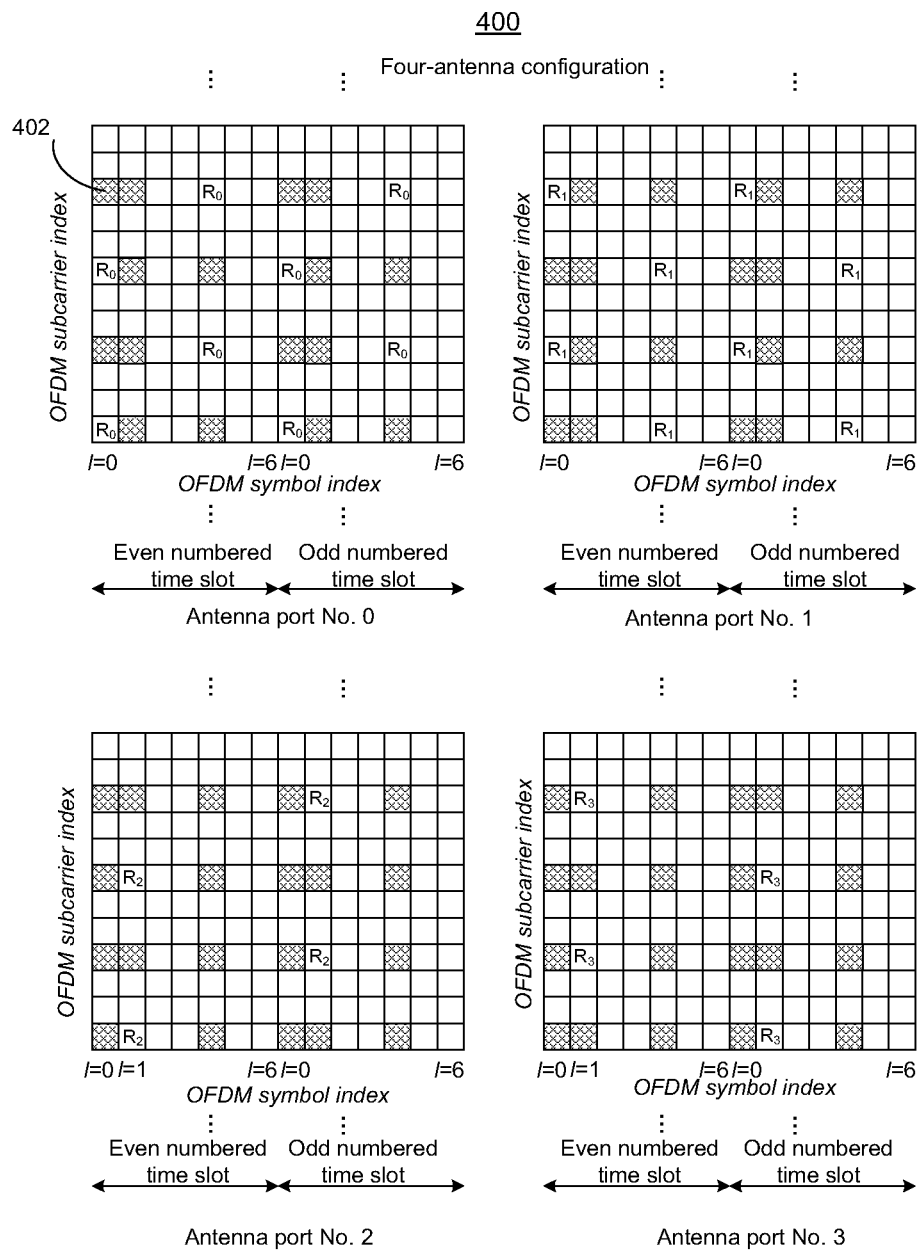
FIG. 4 illustrates a symbol-subcarrier diagram showing the distribution of cell reference symbols in a normal cyclic prefix scheme with a four-antenna configuration, according to another exemplary embodiment.

Pilot signals, also referred to as reference signals (RS), are known signals for purposes of channel estimation or channel detection. In an LTE network, the base station or eNode B in each cell periodically transmits pilot signals such that the mobile phones or UE can detect the cell and estimate channel properties in that cell. Pilot signals are embedded in OFDM symbols transmitted by eNode B. FIGS. 2-4 illustrate some exemplary arrangements of pilot signals on the symbol-subcarrier grid for eNode B transmissions with the normal cyclic prefix scenario.

Symbol-subcarrier grid 200 in FIG. 2 shows the distribution of the cell reference signals with a one-antenna configuration for eNode B transmissions, e.g., antenna port No. 0. In the time dimension, OFDM symbols have indices 0 through 6 in every time slot, with two time slots shown in FIG. 2. Although the exact index numbers are not shown in the figure, subcarriers in the subcarrier dimension (vertical) are also indexed.

As shown in FIG. 2, in the horizontal direction, a subframe is divided into two time slots, namely, the even-numbered slot and the odd-numbered slot. With the normal cyclic prefix shown in FIG. 2, each time slot has 7 OFDM symbols, with indices l=0, l=1, . . . l=6, respectively. In the vertical direction, 12 subcarriers are shown in FIG. 2. Reference signals or pilot signals may comprise multiple reference symbols each occupying one resource element. As an example, in FIG. 2, $R_0$ (reference numeral 202) indicates reference symbols that are transmitted along with data in other resource elements from antenna port No. 0.

In the particular example shown in FIG. 2, in each time slot, reference symbols $R_0$ are distributed in two OFDM symbols with indices l=0 and l=4. In the first OFDM symbol (l=0), reference symbols $R_0$ are carried over the first and seventh subcarriers from the bottom. In the fifth OFDM symbol (l=4), reference symbols $R_0$ are carried over the fourth and tenth subcarriers. In the extended cyclic prefix configuration, which is not shown in the figure, where each time slot has only 6 OFDM symbols, reference symbols may be distributed in the first and fourth (as opposed to fifth) OFDM symbols with indices l=0 and l=3. Reference symbols in the first OFDM symbol of each time slot allows early detection and demodulation of downlink transmissions, i.e., transmissions from the base station or eNode B to the mobile devices.

FIG. 3 illustrates a symbol-subcarrier diagram 300 showing the distribution of cell reference symbols for a two-antenna configuration. In other words, a base station in a cell transmits signals over two antennas, e.g., antenna port No. 0 and antenna port No. 1. In FIG. 3, the symbol-subcarrier diagrams for antenna ports No. 0 and No. 1 are shown separately. In FIG. 3, the distribution of reference symbols for antenna port No. 0 is the same as that shown in FIG. 2, while the distribution of reference symbols for antenna port No. 1 differs from that of antenna port No. 0.

FIG. 3 also shows that some resource blocks (e.g., reference numerals 302, 314) are shaded, indicating no transmission from an antenna. For example, the base station or eNode B transmits no signal from antenna port No. 0 on the fourth subcarrier in the first OFDM symbol, which coincides with a transmission of reference symbol $R_1$ (reference numeral 316) in that same resource element. Likewise, when reference symbol $R_0$ is transmitted from antenna port No. 0 on the first subcarrier in the first OFDM symbol, the base station does not transmit any signal from antenna port No. 1. Because the multiple antennas transmit at the same frequencies, silencing one antenna while transmitting reference symbols from the other antenna is necessary to avoid mutual interferences.

FIG. 4 illustrates a symbol-subcarrier diagram 400 showing the distribution of cell reference symbols for a four-antenna configuration, i.e., antenna port Nos. 0-3. In FIG. 4, the distributions of reference symbols for antenna port Nos. 0 and 1 are the same as those shown in FIG. 3, while the distributions of reference symbols for antenna port Nos. 2 and 3 are different. In the particular example shown in FIG. 4, reference symbols transmitted from antenna port Nos. 2 and 3, labeled in the figure respectively as $R_2$ and $R_3$, are transmitted in one OFDM symbol per time slot as opposed to two OFDM symbols in the case of antenna port Nos. 0 and 1. For example, for antenna port No. 2, reference symbols $R_2$ are in the second OFDM symbol (l=1) of each time slot.

Similar to what FIG. 3 shows, in FIG. 4, shaded blocks, such as block 402, indicate no transmission from the current antenna port in a particular resource element. And, to avoid interference, when reference symbols are transmitted from one of the four antennas, the other three antennas are silent.

As illustrated in FIGS. 2-4, not all OFDM symbols in the received data include reference symbols or pilot signals. An OFDM symbol that does contain pilot signal or data or the reference symbols can be used for noise estimation. One of ordinary skill in the art would appreciate that the distribution of the reference symbols described above is for illustration only and the reference symbols can have other distributions.

Table 1 provides further examples of when reference symbols are transmitted in various antenna and cyclic prefix configurations. Particularly, the table shows the OFDM symbols containing reference symbols in a subframe separately for normal cyclic prefix and extended cyclic prefix configurations and also separately for one-antenna, two-antenna, and four-antenna configurations. In the table, index l indicates the position of the OFDM symbol in the subframe (not the time slots), index p identifies the antenna. Thus, in the normal CP, two-antenna configuration, reference symbols or pilot data are transmitted on both antennas (p=0, 1) in the first (l=0), fifth (l=4), eighth (l=7), and twelfth (l=11) OFDM symbols, which correspond to the first and fifth OFDM symbols in both time slots of the subframe.

TABLE 1

| Cyclic Prefix (CP) | Antenna Configuration | OFDM symbols Containing Cell Pilot Data/Reference Symbols |
|---|---|---|
| Normal CP | 1 | 0(p = 0), 4(p = 0), 7(p = 0), 11(p = 0) |
| Normal CP | 2 | 0(p = 0, 1), 4(p = 0, 1), 7(p = 0, 1), 11(p = 0, 1) |
| Normal CP | 4 | 0(p = 0, 1), 1(p = 2, 3), 4(p = 0, 1), 7(p = 0, 1), 8(p = 2, 3), 11(p = 0, 1) |
| Extended CP | 1 | 0(p = 0), 3(p = 0), 6(p = 0), 9(p = 0) |
| Extended CP | 2 | 0(p = 0, 1), 3(p = 0, 1), 6(p = 0, 1), 9(p = 0, 1) |
| Extended CP | 4 | 0(p = 0, 1), 1(p = 2, 3), 3(p = 0, 1), 6(p = 0, 1), 7(p = 2, 3), 9(p = 0, 1) |

As illustrated in FIGS. 2-4, if a particular transmitting antenna transmits cell pilot data on a particular subcarrier, other transmitting antennas will not transmit data on that same subcarrier. Thus, after equalizing the transmitted information on these subcarriers, the noise in the current wireless environment and the interference between the antennas can be determined. Subsequently, whether the current wireless environment is suitable for transmitting multi-stream MIMO signals can also be determined.

With the above explanation of the frame structure in connection with FIGS. 2-4, method 100 of FIG. 1 for detecting or determining a rank indication is now described in more detail. As an example of sub-step S101a, if it is determined that a subcarrier of an OFDM symbol includes cell pilot data corresponding to a transmitting antenna, the cell pilot data, expressed as RxCellRsData_j_l(i), may be obtained with respect to each receiving antenna: RxCellRsData_j_l(i)= DataAftFft_j_l(k), where DataAftFft_j_l(k) is the frequency domain data, j is the index of the receiving antenna, l is the index of OFDM symbol, and k is the subcarrier index. In the above expression, k=k0+3*i, where k0=$N_{ID}^{cell}$ mod 3. $N_{ID}^{cell}$ is the cell identity, and "mod" represents a modulo operation. In the above expressions, i=0, 1, 2 . . . 2*N_D1_Rb−1, where N_D1_Rb is number of resource blocks on the downlink, where each resource block, as defined in LTE, is a block of resource elements spanning one time slot and 12 subcarriers on the downlink.

In sub-step S101b, the communication terminal obtains channel estimation, expressed as RxCellRsDataChe_j_p_l (i), of subcarrier k that carries cell pilot data in OFDM symbol l with respect to receiving antenna j and transmitting antenna p: RxCellRsDataChe_j_p_l(i)=FreqCheData_p_j_l(k); where FreqCheData_p_j_l(k) is the channel estimation, j is the index of the receiving antenna, p is the index of the transmitting antenna, l is the index of OFDM symbol, and k is the subcarrier index. In the above expression, k=k0+3*i, where k0=$N_{ID}^{cell}$ mod 3; $N_{ID}^{cell}$ is the cell identity, "mod" represents a modulo operation, and i=0, 1, 2 . . . 2*N_D1_Rb− 1.

As shown in FIG. 1, after obtaining the cell pilot data and the channel estimation of subcarriers that have the cell pilot data, the communication performs step S102, i.e., equalization of the cell pilot data based on the channel estimation of the subcarriers. Equalization can be done in any conventional way, such as minimum mean square error (MMSE) estimation, zero forcing equalization, etc. An exemplary description is provided below.

Cell pilot data RxCellRsData_j_l(i) may be expressed as a vector, i.e., $$RxCellRsData\_j\_l(i)=Y(l,i)=[y_0(l,i), y_1(l,i) \ldots, y_{J-1}(l,i)]',$$

where J is the number of receiving antennas, and k, l, i are the same as described above. Channel estimation of the subcarriers that carry cell pilot data, RxCellRsDataChe_j_p_l(i), may be expressed as a matrix, i.e., $$RxCellRsDataChe\_l(i)=H(l,i)=\begin{bmatrix} h_{0,0}(l,i) & & h_{0,P-1}(l,i) \\ & \ldots & \\ h_{J-1,0}(l,i) & & h_{J-1,P-1}(l,i) \end{bmatrix},$$

where J, l, i are the same as described above and P is the number of the transmitting antennas.

Equalized cell pilot data can also be expressed as a vector, i.e., CellRsAftEq_l(k)=X(l,i)=[$x_0(l,i)$, $x_1(l,i)$ . . . , $x_{J-1}(l,i)$]', where J, k, l, i are the same as described above and "'" refers to the matrix transpose operation. Vector X(l, i) can be expressed in terms of the Y(l,i) and H(l,i). For example, if equalization is done through zero forcing, then X(l,i)= H(l,i)$^{-1}$*Y(l,i). If equalization is done with MMSE, then X(l, i)=[H(l,i)$^T$*H(l,i)+$\delta^2$*I]$^{-1}$*H(l,i)$^T$*Y(l,i), where δ is the variance of noise, I is the identify matrix or unit matrix, and T also refers to the matrix transpose operation. One of ordinary skill in the art would appreciated that other equalization methods, such as decision feedback equalization, can be used to obtain equalized cell pilot data.

Then, in step S103, the equalized pilot data can be used to determine the transmission power of the corresponding transmitting antenna. The transmission power of transmitting antenna p can be determined for each OFDM symbol l and subcarrier i as CellsRsPilotPow_p_l(i)=|$x_p(l,i)$|$^2$, or CellsRsPilotPow_p_l(i)=|($x_p(l,i)$)|.

Because each subcarrier i in each OFDM symbol l can only contain pilot data from one transmitting antenna, only the transmission power calculated for the one transmitting represents the power of cell pilot data, while the transmission power calculated in step S103 for any other antenna is noise or interference due to poor correlation between channels, which are collectively referred to as interference herein. Therefore, the power of cell pilot data can be selected from the transmission power of the transmitting antennas.

More specifically, in step S104 shown in FIG. 1, the communication terminal separates the power of pilot signals or pilot data from interference by selecting the transmission power calculated in step S103 corresponding to cell pilot transmissions as the power of pilot signals and considering the transmission power calculated in step S103 that does not correspond to a cell pilot transmission as interference. More detailed explanation follows.

To select the cell pilot data transmission power, the communication terminal must determine the positions of cell pilot signals or pilot data for a transmitting antenna, for example, based on information in Table 1. For example, as explained in §6.10.1.2 of 3GPP Technical Specification 36.211, a cell specific frequency shift $v_{shift}$ computed as $v_{shift}=N_{ID}^{cell}$ mod 6, where $N_{ID}^{cell}$ is the cell ID, determines the positions of cell pilot signals for a transmitting antenna. Once the positions of cell pilot signals are determined for antenna, the communication terminal identifies, in step S104, the corresponding transmission power calculated in step S103 as the transmission power of the cell pilot data.

For example, for transmitting antenna port No. 0:
If $v_{shift}$ is less than 3, then CellsRsPilotPow_0_l(2*m) is selected as the power level of pilot data, where m is any natural number within the range of subcarrier index i for subcarriers carrying pilot data (the same below). l=0, 4, 7, 11 with normal CP, and l=0, 3, 6, 9 with extended CP.
If $v_{shift}$ is equal to or greater than 3, then CellsRsPilotPow_0_l(2*m+1) is selected as the power level of pilot data. l=0, 4, 7, 11 with normal CP, and l=0, 3, 6, 9 with extended CP.
For transmitting antenna port No. 1:
If $v_{shift}$ is less than 3, then CellsRsPilotPow_1_l(2*m+1) is selected as the power level of pilot data. l=0, 4, 7, 11 with normal CP, and l=0, 3, 6, 9 with extended CP.
If $v_{shift}$ is equal to or greater than 3, then CellsRsPilotPow_1_l(2*m) is selected as the power level of pilot data. l=0, 4, 7, 11 with normal CP, and l=0, 3, 6, 9 with extended CP.
For transmitting antenna port No. 2:
If $v_{shift}$ is less than 3, then CellsRsPilotPow_2_l(2*m) is selected as the power level of pilot data. l=1, 8 with normal CP, and l=1, 7 with extended CP.
If $v_{shift}$ is equal to or greater than 3, then CellsRsPilotPow_2_l(2*m+1) is selected as the power level of pilot data. l=1, 8 with normal CP, and l=1, 7 with extended CP.
For transmitting antenna port No. 3:
If $v_{shift}$ is less than 3, then CellsRsPilotPow_3_l(2*m+1) is selected as the power level of pilot data. l=1, 8 with normal CP, and l=1, 7 with extended CP.
If $v_{shift}$ is equal to or greater than 3, then CellsRsPilotPow_3_l(2*m) is selected as the power level of pilot data. l=1, 8 with normal CP, and l=1, 7 with extended CP.

The transmission power calculated in step S103 for any other subcarrier carrying pilot data but not identified in step S104 is considered interference. One of ordinary skill in the art would appreciate that, in the example above, if there are only two transmitting antennas, or if the communication terminal can only receive data from two transmitting antennas, then no determination needs to be made with respect to transmitting antenna port Nos. 2 and 3.

Once the power level of cell pilot data and interference power are determined, the communication terminal in step S105 computes a power ratio based on the pilot frequency power and the interference power. The power ratio may be the ratio of the pilot frequency power to the interference power, or the ratio of the interference power to the pilot frequency power.

In some embodiments, the communication terminal may smooth or average the power of pilot data and/or smooth or average the interference power. Then the communication terminal may compute a ratio of the smoothed or averaged pilot power to the smoothed or averaged interference power or a ratio of the smoothed or averaged interference power to the smoothed or averaged pilot power. For example, the pilot power and interference power, both obtained from step S104 and expressed respectively as CellRsSendPow_p_l(m) and CellRsDetNoise_p_l(m) may be smoothed or averaged, with the results respectively expressed as CellRsAvePow and CellRsAveNoise. CellRsAvePow may be the overall mean value of the pilot power smoothed or averaged over all transmitting antennas and all OFDM symbols. Similarly, CellRsAveNoise may be the overall mean value of interference power smoothed or averaged over all transmitting antennas and all OFDM symbols. In some embodiments, the communication terminal may smooth or average the pilot power or interference power over a frame or a subframe.

Consistent with embodiments of the present disclosure, smoothing may be a one-dimensional or a two-dimensional filtering through an infinite impulse response (IIR) filter or a finite impulse response (FIR) filter. Both the IIR filter and the FIR filter can be a band-pass filter or a low-pass filter. In some embodiments, the communication terminal may perform both the smoothing and averaging processes on both the pilot power and the interference power. The communication terminal may perform the smoothing process first and then the averaging process. In some other embodiments, the communication terminal may perform the smoothing or averaging process selectively on the pilot power or the interference power, but not both.

After acquiring the smoothed or averaged pilot frequency power CellRsAvePow and the smoothed or averaged interference power CellRsAveNoise, the communication terminal computes a ratio of the two powers, either a ratio of CellRsAveNoise to CellRsAvePow or a ratio of CellRsAvePow to CellRsAveNoise. In particular, a power ratio of the pilot power to interference power, LayerPowNoiseRate, is computed as CellRsAvePow/CellRsAveNoise. A power ratio of the interference power to pilot power, LayerNoisePowRate, is computed as CellRsAveNoise/CellRsAvePow. Because CellRsAveNoise and CellRsAvePow are the overall mean values of the smoothed or averaged pilot power and the smoothed or averaged interference power over all transmitting antennas and all OFDM symbols, LayerNoisePowRate and LayerPowNoiseRate also reflect mean values across all transmitting antennas.

In some embodiments, the ratio LayerNoisePowRate or the ratio LayerPowNoiseRate can be further smoothed or averaged over a frame or a subframe, and the result can be used for determining the rank indication parameter in the subsequent steps as shown in FIG. 1.

In some other embodiments, in step S105, the communication terminal may smooth or average the pilot power and the interference power and then compute a ratio between the smoothed or averaged pilot power and the smoothed or averaged interference power for each transmitting antenna and each OFDM symbol containing cell pilot data, resulting in a ratio of noise to pilot power LayerNoisePowRate_p_l or a ratio of pilot power to noise LayerPowNoiseRate_p_l. The communication terminal may further smooth or average the ratio LayerNoisePowRate_p_l or LayerPowNoiseRate_p_l over one of two dimensions, i.e., transmitting antenna or OFDM symbol, as the overall power ratio LayerNoisePowRate or LayerPowNoiseRate. Alternatively, the communication terminal may identify the maximum or minimum values of the ratio LayerNoisePowRate_p_l or LayerPowNoiseRate_p_l as the overall power ratio LayerNoisePowRate or LayerPowNoiseRate.

Once the power ratio LayerNoisePowRate or LayerPowNoiseRate is determined, the communication terminal determines rank indication in step S106 shown in FIG. 1. Consistent with embodiments of the present disclosure, the communication terminal compares the power ratio to a threshold and determines rank indication based on the comparison. The threshold may be set to reflect the boundary conditions for multi-stream MIMO transmission. The actual setting of the threshold value may vary depending on the circumstances.

For example, if the power ratio is the ratio of interference power to pilot power, the communication terminal compares the ratio to a threshold value. Assuming two transmitting antennas are employed, if the power ratio is greater than the threshold, suggesting a relatively high interference level, then the communication terminal may determine the rank indication to be 1, indicating that the base station should be transmitting only one codeword at a time. If, on the other hand, the power ratio is less than the threshold, suggesting a relatively low interference level, then the communication terminal may determine the rank indication to be 2, indicating that the base station may transmit two codewords at a time.

If the number of receiving antennas and the number of transmitting antennas are both 4, then the communication terminal may determine the rank indication to be 4 when the power ratio is less than the threshold value or 1 when the power ratio is greater than the threshold value.

Thus, with the threshold value expressed as Threshold1, the communication terminal compares the noise-to-power ratio LayerNoisePowRate with Threshold1. If both the number J of receiving antennas and the number P of transmitting antennas are 2, the communication terminal determines RI to be 2 if LayerNoisePowRate<Threshold1 and determines RI to be 1 otherwise. An RI of 2 may indicate that the current wireless environment has relatively good quality and is suitable for multi-stream MIMO transmissions. An RI of 1 may indicate that the current wireless environment has relatively low quality and is not suitable for multi-stream MIMO transmissions. If both the number J of receiving antennas and the number P of transmitting antennas are 4, the communication terminal determines RI to be 4 if LayerNoisePowRate<Threshold1 and determines RI to be 1 otherwise. Likewise, an RI of 4 indicates that the current wireless environment has relatively good quality and is suitable for multi-stream MIMO transmissions.

Alternatively, if the power ratio is the ratio of pilot power to interference power, the communication terminal also compares the ratio to a threshold value. Assuming two transmitting antennas are employed, if the power ratio is less than the threshold, suggesting a relatively high interference level, then the communication terminal may determine the rank indication to be 1, indicating that the base station should be transmitting only one codeword at a time. If, on the other hand, the power ratio is greater than the threshold, suggesting a relatively low noise or interference level, then the communication terminal may determine the rank indication to be 2, indicating that the base station may transmit two codewords at a time.

If the number of receiving antennas and the number of transmitting antennas are both 4, then the communication terminal may determine the rank indication to be 4 when the power ratio is greater than the threshold value or 1 when the power ratio is less than the threshold value.

Thus, with the threshold value expressed as Threshold1, the communication terminal compares the power-to-noise ratio LayerPowNoiseRate with Threshold1. If both the number J of receiving antennas and the number P of transmitting antennas are 2, the communication terminal determines RI to be 1 if LayerPowNoiseRate<Threshold1 and determines RI to be 2 otherwise. If both the number J of receiving antennas and the number P of transmitting antennas are 4, the communication terminal determines RI to be 1 if LayerPowNoiseRate<Threshold1 and determines RI to be 4 otherwise.

In the above described embodiments, the number of transmitting antennas is more than 1. When only one transmitting antenna is employed, the above described steps for determining RI may not be needed and the communication terminal may directly report an RI of 1 to the base station. That is, the above described steps of determining rank indication are only needed when more than one antenna is employed.

In some embodiments, not all the transmitting antennas and receiving antennas need to be considered to determine RI. For example, even when there are 4 receiving antennas and 4 transmitting antennas, the communication terminal may obtain cell pilot data with respect to only 2 receiving antennas and 2 transmitting antennas in step S101*a* of FIG. 1. Correspondingly, in step S102, even if the number of transmitting antennas is 4 and the communication terminal is capable of demodulating all 4 transmitting antennas, the communication terminal may equalize the cell pilot data for only the 2 selected pairs (2*2) of receiving and transmitting antennas. While accuracy may be slightly compromised by considering only a subset of all the transmitting and receiving antennas, the selective equalization process can greatly reduce the amount of computation and improve efficiency.

As an example, with respect to OFDM symbols 0, 4, 7, and 11 in the case of normal CP, or with respect to OFDM symbols 0, 3, 6, and 9 in the case of extended CP, the communication terminal may only need to equalize cell pilot data for transmitting antennas p=0 and 1. Likewise, with respect to OFDM symbols 1 and 8 in the case of normal CP, or with respect to OFDM symbols 1 and 7 in the case of extended CP, the communication terminal may only need to equalize cell pilot data for transmitting antennas p=2 and 3. Correspondingly, in step S101, the communication terminal only needs to obtain cell pilot data for the corresponding transmitting antennas, instead of cell pilot data for all receiving or transmitting antennas.

Similarly, when acquiring the interference power and the pilot frequency power in the subsequent steps, for any particular OFDM symbol, it is not needed to acquire power of all transmitting antennas based on the equalized data, or to smooth or average the pilot frequency power and the interference power for all transmitting antennas. For example, with respect to OFDM symbol 0, the communication terminal does not need to determine or smooth the power of transmitting antennas p=2 and 3.

Figure 5:
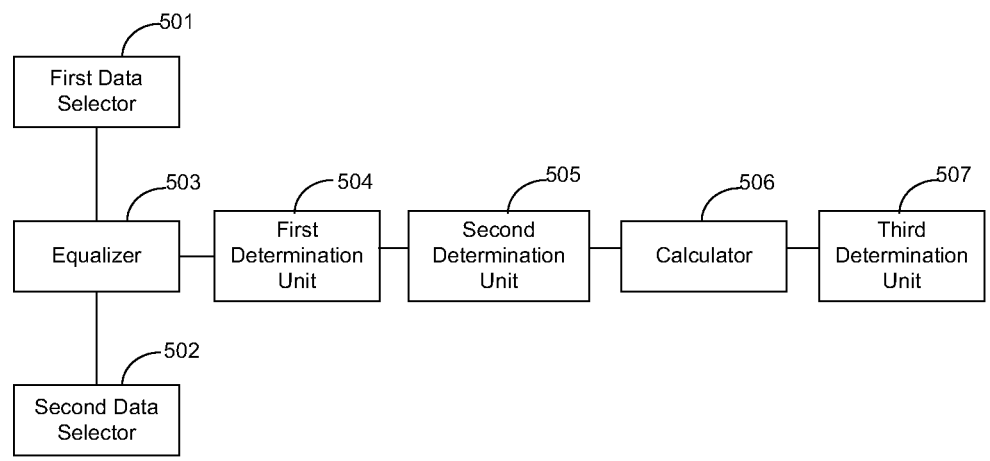
FIG. 5 illustrates an exemplary block diagram showing components for determining a rank indication in an apparatus, according to an exemplary embodiment.

FIG. 5 is an exemplary block diagram of a communication terminal, such as apparatus 500, showing components for determining rank indication consistent with embodiments of the present disclosure. As shown in FIG. 5, apparatus 500 includes a first data selector 501 that identifies or extracts cell pilot data from the frequency domain data in received OFDM symbols; a second data selector 502 that identifies or extracts a channel estimation of subcarriers having cell pilot data from the frequency domain channel estimation of the OFDM symbols; an equalizer 503 that equalizes the cell pilot data based on the channel estimation; a first determination unit 504 that determines the power of transmitting antenna(s) based on the equalized cell pilot data; a second determination unit 505 that determines pilot power and interference power based on the power of the transmitting antenna(s); a calculator 506 that calculates a power ratio or power ratios for the transmitting antenna(s), based on the pilot power and interference power; and a third determination unit 507 that determines rank indication based on the power ratio or power ratios. Although not shown in the figure, apparatus 500 may also include a receiver that receives the OFDM symbols and an estimator that computes the channel estimation.

Second determination unit 505 may include a component that determines a cell specific frequency shift corresponding to a cell identity and a component that determines the locations of pilot data based on cell configuration and the cell specific frequency shift.

Calculator 506 may calculate a ratio of the pilot power to the interference power, or a ratio of the interference power to the pilot power. In some embodiments, calculator 506 may smooth or average the pilot power and the interference power and may compute a ratio of the smoothed or averaged pilot power to the smoothed or averaged interference power. In some other embodiments, calculator 506 may smooth or average the pilot power and the interference power, may compute a ratio of the smoothed or averaged pilot power to the smoothed or averaged interference power, and may smooth the ratio over a sub-frame or frame.

Further, calculator 506 may smooth or average the pilot power and the interference power for transmitting antenna(s) and the OFDM symbols having the cell pilot data and compute power ratios of the smoothed or averaged pilot power to the smoothed or averaged interference power for the transmitting antenna(s) and the OFDM symbols having the cell pilot data. Calculator 506 may further smooth or average the power ratios or determine a maximum or a minimum value of the power ratios across OFDM symbols having the cell pilot data and/or across transmitting antennas.

Third determination unit 507 compares the power ratio generated by calculator 506 with a threshold. In some embodiments, the power ratio is a ratio of interference power to pilot power, in which case if the number of receiving antennas and the number of transmitting antennas are both 2, third determination unit 507 determines rank indication as 2 when the power ratio is less than the threshold, or determines rank indication as 1 otherwise. When the number of receiving antennas and the number of transmitting antennas are both 4, third determination unit 507 determines rank indication as 4 when the power ratio is less than the threshold, or determines rank indication as 1 otherwise.

In some other embodiments, the power ratio is a ratio of pilot power to interference power, in which case if the number of receiving antennas and the number of transmitting antennas are both 2, third determination unit 507 determines rank indication as 2 when the power ratio is greater than the threshold, or determines rank indication as 1 otherwise. When the number of receiving antennas and the number of transmitting antennas are both 4, third determination unit 507 determines rank indication as 4 when the power ratio is greater than the threshold, or determines rank indication as 1 otherwise.

In some other embodiments, third determination unit 507 may include two components for separately performing the determination based on a ratio of interference power to pilot power and the determination based on a ratio of pilot power to interference power and a selector that selects or enables one of the two components and outputs RI.

In some embodiments, first data selector 101 obtains cell pilot data corresponding to 2 receiving antennas and 2 transmitting antennas based on OFDM symbols containing cell pilot data, when the number of receiving antennas and the number of transmitting antennas are both 4.

Moreover, there is also provided a communication terminal. The communication terminal may include the various embodiments of the apparatus 500 as described above. One of ordinary skill in the art would appreciate that the various embodiments of the apparatus 500 as described above can be included in the various embodiments of the communication terminal. The description of various embodiments of the communication terminal and the apparatus correspond to the methods as described above and thus will not be repeated here.

Furthermore, there are also provided embodiments of User Equipments (UEs), mobile stations, communication systems that include various embodiments of the apparatuses or communication terminals that are the same as or similar to those as described above. The User Equipments (UEs), mobile stations, and communication systems may include any one of or a combination of antennas, transmitters, base stations, eNodeBs, relay stations, access points, receivers, processors, memories, and other components.

Methods and apparatus described herein can efficiently determine rank indication of a MIMO channel matrix and indicate whether throughput can be improved by multi-stream MIMO transmissions in the current channel environment. The determination of RI consistent with embodiments of the present disclosure also involves simple and convenient computation.

One of ordinary skill in the art would appreciate that features of the components illustrated in FIG. 5 and described above can be implemented in either hardware or software. For example, data selectors 501 and 502 may be implemented in hardware as multiplexers and/or determination logic circuits; or, alternatively, implemented in software that, for example, receives and selectively stores frequency domain data. Likewise, one of ordinary skill in the art would appreciate that other components illustrated in FIG. 5 can also be implemented either in hardware or in software.

Communication terminals consistent with embodiments of the present disclosure, such as the apparatus illustrated in FIG. 5, may be user equipment (UE) or mobile stations, or systems including such. Although not discussed herein, UE or mobile stations may include any one of or a combination of antennas, receivers, transmitters, processors, memories, and/or any other well-known communication components. Systems including UE or mobile stations may also include base stations, eNode Bs, relay stations, and/or access points. Communication terminals consistent with embodiments of the present disclosure may operate in LTE, WiMAX, WiFi, and/or any other multicarrier modes.

Furthermore, one of ordinary skill in the art would appreciate that the illustrated procedures and apparatus components can be modified without deviating from the spirit of the invention. For example, in the processes described above, additional steps may be introduced or certain steps may be removed. In the apparatus illustrated in FIG. 5, several individual components may be combined into one, such as an integrated circuit chip, or features or functions of a certain component may be divided across multiple hardware or software components.

Other embodiments of the subject matter will be apparent to those skilled in the art from consideration of the specification and practice of the subject matter disclosed herein. The scope of the disclosed subject matter is intended to cover any variations, uses, or adaptations of the subject matter following the general principles thereof and including such departures from the present disclosure as come within known or customary practice in the art. It is intended that the specification and examples be considered as exemplary only, with a true scope and spirit of the subject matter being indicated by the following claims.

It will be appreciated that the present disclosure is not limited to the exact construction that has been described above and illustrated in the accompanying drawings, and that various modifications and changes can be made without departing from the scope thereof. It is intended that the scope of the subject matter only be limited by the appended claims.

What is claimed is:

1. A method in a communication terminal for determining rank indication in a multicarrier communication system, wherein communication in the multicarrier communication system is carried out over a plurality of subcarriers, wherein the communication terminal communicates with an interface station within a cell in a multiple-input-multiple-output (MIMO) configuration, the method comprising:
    receiving multicarrier symbols, the multicarrier symbols including pilot signals from the interface station, wherein the pilot signals contain pilot data;
    estimating channel properties based on the received multicarrier symbols, wherein the channel properties include channel properties of at least one subcarrier carrying one of the pilot signals;
    equalizing the pilot data based on the channel properties;
    determining at least one pilot power and at least one interference power based on the equalized pilot data;
    computing at least one power ratio between the at least one pilot power and the at least one interference power; and
    generating the rank indication by comparing the at least one power ratio to a threshold value.

2. The method of claim 1, wherein the multicarrier communication system is based on orthogonal frequency division multiplexing (OFDM) technology and the multicarrier symbols are OFDM symbols.

3. The method of claim 1, wherein the equalizing comprises minimum mean square error (MMSE) estimation or zero forcing equalization.

4. The method of claim 1, wherein the pilot data include pilot data transmitted by the interface station from multiple transmitting antennas.

5. The method of claim 4, wherein the equalizing generates equalized pilot data separately for the multiple transmitting antennas, the plurality of subcarriers, and/or the multicarrier symbols, and
    wherein determining the at least one pilot power and the at least one interference power comprises:
        determining, based on the equalized pilot data, transmission powers for at least one of the multiple transmitting antennas for each subcarrier in each multicarrier symbol carrying pilot data;
        identifying at least one subcarrier and at least one multicarrier symbol carrying pilot data from the at least one of the multiple transmitting antennas;
        determining the at least one pilot power for the at least one of the multiple transmitting antennas based on the transmission powers for the at least one of the multiple transmitting antennas and the at least one subcarrier and the at least one multicarrier symbol; and
        determining the at least one interference power for the at least one of the multiple transmitting antennas based on the transmission powers for the at least one of the multiple transmitting antennas and subcarriers and/or multicarrier symbols other than the at least one subcarrier and the at least one multicarrier symbol.

6. The method of claim 5, wherein the equalizing generates equalized pilot data only for the subcarriers carrying the pilot signals.

7. The method of claim 5, wherein the identifying comprises detecting a system configuration of the cell, the system configuration including a cell specific frequency shift and a mode of cyclic prefix.

8. The method of claim 5, wherein determining the at least one pilot power comprises smoothing the transmission powers for the at least one of the multiple transmitting antennas.

9. The method of claim 8, wherein the smoothing comprises a one-dimensional or two-dimensional filtering with an infinite impulse response (IIR) filter or a finite impulse response (FIR) filter, or an averaging process.

10. The method of claim 8, wherein the smoothing comprises smoothing the transmission powers of the at least one of the multiple transmitting antennas across all subcarriers in a multicarrier symbol carrying pilot data for the at least one of the multiple transmitting antennas.

11. The method of claim 8, wherein the smoothing comprises smoothing the transmission powers of the at least one of the multiple transmitting antennas across all subcarriers in all multicarrier symbols carrying pilot data for the at least one of the multiple transmitting antennas.

12. The method of claim 5, wherein determining the at least one interference power comprises smoothing the transmission powers for the at least one of the transmitting antennas.

13. The method of claim 12, wherein the smoothing comprises a one-dimensional or two-dimensional filtering with an infinite impulse response (IIR) filter or a finite impulse response (FIR) filter, or an averaging process.

14. The method of claim 12, wherein the smoothing comprises smoothing the transmission powers for the at least one of the multiple transmitting antennas across all subcarriers in a multicarrier symbol carrying pilot data not for the at least one of the transmitting antennas.

15. The method of claim 12, wherein the smoothing comprises smoothing the transmission powers for the at least one of the multiple transmitting antennas across all subcarriers in all multicarrier symbols carrying pilot data not for the at least one of the transmitting antennas.

16. The method of claim 5, wherein the identifying comprises identifying, for each of the multiple transmitting antennas, all of the subcarriers and multicarrier symbols carrying corresponding pilot data; and wherein determining the at least one pilot power comprises smoothing the transmission powers across all transmitting antennas, and all subcarriers and multicarrier symbols carrying the corresponding pilot data.

17. The method of claim 5, wherein the identifying comprises identifying, for each of the multiple transmitting antennas, all of the subcarriers and multicarrier symbols carrying corresponding pilot data; and wherein determining the at least one interference power comprises smoothing the transmission powers across all transmitting antennas, and all subcarriers and multicarrier symbols carrying the pilot data not corresponding to the respective transmitting antennas.

18. The method of claim 1, wherein the power ratio is a ratio of the at least one pilot power to the at least one interference power or a ratio of the at least one interference power to the at least one pilot power.

19. The method of claim 1, wherein computing the at least one power ratio comprises computing power ratios each for a transmitting antenna and a multicarrier symbol.

20. The method of claim 19, further comprising smoothing, or identifying a maximum value or a minimum value of, the power ratios across all transmitting antennas, wherein the generating comprises generating the rank indication by comparing the smoothed power ratios, the maximum value, or the minimum value, with the threshold value.

21. The method of claim 19, further comprising smoothing, or identifying a maximum value or a minimum value of, the power ratios across all multicarrier symbols, wherein the generating comprises generating the rank indication by comparing the smoothed power ratios, the maximum value, or the minimum value, with the threshold value.

22. The method of claim 21, wherein the smoothing, or identifying a maximum value or a minimum value comprises smoothing, or identifying a maximum value or a minimum value of, the power ratios across all multicarrier symbols within a frame or a subframe.

23. The method of claim 1, wherein determining the rank indication comprises determining the rank indication based on pilot powers and interference powers associated with a subset of all available transmitting antennas in the MIMO configuration.

24. The method of claim 1, wherein the communication terminal operates in one or more of LTE, WiMAX, and WiFi networks.

25. A communication terminal in a multicarrier communication system, wherein communication in the multicarrier communication system is carried out over a plurality of subcarriers, wherein the communication terminal communicates with an interface station within a cell in a multiple-input-multiple-output (MIMO) configuration, the communication terminal comprising:
    a receiver that receives multicarrier symbols, the multicarrier symbols including pilot signals from the interface station, wherein the pilot signals contain pilot data, which is at least used for determining a rank indication;
    an estimator that estimates channel properties based on the received multicarrier symbols, wherein the channel properties include channel properties of at least one subcarrier carrying one of the pilot signals;
    an equalizer that equalizes the pilot data based on the channel properties;
    a first determination unit that determines at least one pilot power and at least one interference power based on the equalized pilot data; and
    a second determination unit that computes at least one power ratio between the at least one pilot power and the at least one interference power and generates the rank indication by comparing the at least one power ratio to a threshold value.

26. The communication terminal of claim 25, wherein the multicarrier communication system is based on orthogonal frequency division multiplexing (OFDM) technology and the multicarrier symbols are OFDM symbols.

27. The communication terminal of claim 25, wherein the equalizer performs minimum mean square error (MMSE) estimation or zero forcing equalization.

28. The communication terminal of claim 25, wherein the pilot data include pilot data transmitted by the interface station from multiple transmitting antennas.

29. The communication terminal of claim 28, wherein the equalizer generates equalized pilot data separately for the multiple transmitting antennas, the plurality of subcarriers, and/or the multicarrier symbols, the communication terminal further comprising:
    a third determination unit that determines, based on the equalized pilot data, transmission powers for at least one of the multiple transmitting antennas for each subcarrier in each multicarrier symbol carrying pilot data;
    a first component that determines a cell specific frequency shift corresponding to a cell identity; and
    a second component that determines locations of pilot data in terms of subcarriers and multicarrier symbols based on cell configuration and the cell specific frequency shift,
    wherein the first determination unit determines the at least one pilot power for the at least one of the multiple transmitting antennas based on the transmission powers for the at least one of the multiple transmitting antennas and the at least one subcarrier and the at least one multicarrier symbol, and
    wherein the first determination unit determines the at least one interference power for the at least one of the multiple transmitting antennas based on the transmission powers for the at least one of the multiple transmitting antennas and subcarriers and/or multicarrier symbols other than the at least one subcarrier and the at least one multicarrier symbol.

30. The communication terminal of claim 29, wherein the equalizer generates equalized pilot data only for the subcarriers carrying the pilot signals.

31. The communication terminal of claim 29, wherein the first determination unit determines the at least one pilot power by smoothing the transmission powers for the at least one of the multiple transmitting antennas.

32. The communication terminal of claim 31, wherein the first determination unit smoothes the transmission powers through a one-dimensional or two-dimensional filtering with an infinite impulse response (IIR) filter or a finite impulse response (FIR) filter, or an averaging process.

33. The communication terminal of claim 31, wherein the first determination unit smoothes the transmission powers of the at least one of the multiple transmitting antennas across all subcarriers in a multicarrier symbol carrying pilot data for the at least one of the multiple transmitting antennas.

34. The communication terminal of claim 31, wherein the first determination unit smoothes the transmission powers of the at least one of the multiple transmitting antennas across all subcarriers in all multicarrier symbols carrying pilot data for the at least one of the multiple transmitting antennas.

35. The communication terminal of claim 29, wherein the first determination unit determines the at least one interference power by smoothing the transmission powers for the at least one of the transmitting antennas.

36. The communication terminal of claim 35, wherein the first determination unit smoothes the transmission powers through a one-dimensional or two-dimensional filtering with an infinite impulse response (IIR) filter or a finite impulse response (FIR) filter, or an averaging process.

37. The communication terminal of claim 35, wherein the first determination unit smoothes the transmission powers for the at least one of the multiple transmitting antennas across all subcarriers in a multicarrier symbol carrying pilot data not for the at least one of the transmitting antennas.

38. The communication terminal of claim 35, wherein the first determination unit determines smoothes the transmission powers for the at least one of the multiple transmitting antennas across all subcarriers in all multicarrier symbols carrying pilot data not for the at least one of the transmitting antennas.

39. The communication terminal of claim 29, wherein the second component identifies, for each of the multiple transmitting antennas, all of the subcarriers and multicarrier symbols carrying corresponding pilot data; and wherein the first determination unit determines the at least one pilot power by smoothing the transmission powers across all transmitting antennas, and all subcarriers and multicarrier symbols carrying the corresponding pilot data.

40. The communication terminal of claim 29, wherein the second component identifies, for each of the multiple transmitting antennas, all of the subcarriers and multicarrier symbols carrying corresponding pilot data; and wherein the first determination unit determines the at least one interference power by smoothing the transmission powers across all transmitting antennas, and all subcarriers and multicarrier symbols carrying the pilot data not corresponding to the respective transmitting antennas.

41. The communication terminal of claim 25, wherein the power ratio is a ratio of the at least one pilot power to the at least one interference power or a ratio of the at least one interference power to the at least one pilot power.

42. The communication terminal of claim 25, wherein the second determination unit computes power ratios each for a transmitting antenna and a multicarrier symbol.

43. The communication terminal of claim 42, wherein the second determination unit further smoothes, or identifies a maximum value or a minimum value of, the power ratios across all transmitting antennas, and generates the rank indication by comparing the smoothed power ratios, the maximum value, or the minimum value, with the threshold value.

44. The communication terminal of claim 42, wherein the second determination unit further smoothes, or identifies a maximum value or a minimum value of, the power ratios across all multicarrier symbols, and generates the rank indication by comparing the smoothed power ratios, the maximum value, or the minimum value, with the threshold value.

45. The communication terminal of claim 44, wherein the second determination unit smoothes, or identifies a maximum value or a minimum value of, the power ratios across all multicarrier symbols within a frame or a subframe.

46. The communication terminal of claim 25, wherein the second determination unit determines the rank indication based on pilot powers and interference powers associated with a subset of all available transmitting antennas in the MIMO configuration.

47. The communication terminal of claim 25, wherein the communication terminal operates in one or more of LTE, WiMAX, and WiFi networks.

* * * * *